United States Patent
Albright et al.

[11] Patent Number: 6,166,516
[45] Date of Patent: Dec. 26, 2000

[54] BATTERY CHARGER FOR TOWED VEHICLES AND THE LIKE

[75] Inventors: Marcia S. Albright, Coldwater; Larry Eccleston, Marshall; Dennis M. Morse, Jackson, all of Mich.; Bruce E. Smith, Leo, Ind.

[73] Assignee: Tekonsha Engineering Company, Tekonsha, Mich.

[21] Appl. No.: 09/189,015

[22] Filed: Nov. 9, 1998

[51] Int. Cl.[7] .................................................. H02J 7/00
[52] U.S. Cl. .......................... 320/104; 320/105; 320/144
[58] Field of Search ..................... 320/105, 104, 320/144

[56] References Cited

U.S. PATENT DOCUMENTS

| | | | |
|---|---|---|---|
| 3,597,654 | 8/1971 | Harland, Jr. | 361/18 |
| 3,612,982 | 10/1971 | Jones et al. | 322/28 |
| 3,775,659 | 11/1973 | Carlsen, II | 320/140 |
| 3,911,350 | 10/1975 | Swope | 320/154 |
| 4,010,410 | 3/1977 | Kilbourn | 320/152 |
| 4,127,782 | 11/1978 | Omura et al. | 307/10.1 |
| 4,207,512 | 6/1980 | Taylor | 320/123 |
| 4,422,032 | 12/1983 | Kakumoto et al. | 320/139 |
| 4,468,605 | 8/1984 | Fitzgerald et al. | 320/152 |
| 4,472,672 | 9/1984 | Pacholok | 320/145 |
| 4,647,833 | 3/1987 | Munnig Schmidt | 320/140 |
| 4,727,306 | 2/1988 | Misak et al. | 320/152 |
| 4,843,300 | 6/1989 | Alderman | 323/224 |
| 4,992,722 | 2/1991 | Murayama et al. | 320/150 |
| 5,045,768 | 9/1991 | Pelly | 320/164 |
| 5,142,215 | 8/1992 | Mathison | 320/141 |
| 5,150,033 | 9/1992 | Conway | 320/112 |
| 5,289,103 | 2/1994 | Eccleston | 320/144 |
| 5,710,503 | 1/1998 | Sideris et al. | 320/153 |
| 5,867,008 | 2/1999 | Du et al. | 320/136 |
| 5,923,148 | 7/1999 | Sideris et al. | 320/116 |

*Primary Examiner*—Peter S. Wong
*Assistant Examiner*—Pia Tibbits
*Attorney, Agent, or Firm*—Price, Heneveld, Cooper, DeWitt & Litton

[57] ABSTRACT

An electrical charging circuit for applying a controlled charge to a receiving device, such as a battery, and particularly such as a battery carried on a towed vehicle such as a trailer for actuating the trailer brakes during emergency situations such as unexpected disconnection from the towing vehicle, i.e., break-away. In a basic sense, the charging circuit includes a voltage potential-responsive element or component for sensing the charged level of the receiving device coupled to the circuit and enabling or disabling the circuit charging operation, together with a variable-conductance circuit component for producing a generally constant charging voltage output to the receiving device over a wide range of applied voltages but also operable to provide a first amount of current flow to the receiving device at a given applied voltage and temperature but a second a limited amount of current flow when the voltage across the charging circuit is sufficiently large. In its most preferred embodiment, the voltage responsive component may be a diode switch, and the variable-conductance circuit component may be a positive temperature coefficient (PTC) thermistor.

4 Claims, 1 Drawing Sheet

BATTERY CHARGER FOR TOWED VEHICLES AND THE LIKE

FIELD OF THE INVENTION

The present invention relates to battery chargers and, more generally, to circuits for supplying a charging voltage from a primary source to a secondary source. More particularly, the invention relates to a circuit for supplying a controlled charging voltage from a towing vehicle battery to the battery carried on a remote towed vehicle, such as a sealed lead-acid battery.

BACKGROUND

For certain towed vehicles, such as trailers rated at or above a certain minimum size, applicable laws and standards often require that the towed vehicle have an onboard system for actuating its braking system independently of the towing vehicle in the event that the towed vehicle become disengaged from the towing vehicle. Such towed vehicles typically include an electrically actuated brake system which is powered from the towing vehicle electrical system during normal towing conditions. If and when the towed vehicle breaks away from the towing vehicle, a secondary battery mounted on the towed vehicle supplies power to the electric brakes to bring the towed vehicle to a stop. However, before this ever happens, the secondary battery may become discharged and, therefore, may not be able to independently provide sufficient power to actuate the electric brakes on the towed vehicle. Because reliable brake actuation requires a fully charged battery, various systems have previously been developed to charge the battery on the towed object from the towing vehicle while the two are connected together, to thereby ensure that the secondary battery is sufficiently charged for such emergency conditions.

One such previously developed charging system is disclosed in U.S. Pat. No. 5,289,103, commonly owned with the present invention and expressly incorporated herein by reference, which pertains to a particularly advantageous battery charger for a towed vehicle. The battery charger disclosed in the '103 patent is a three-stage charger for recharging secondary batteries, typically sealed lead-acid batteries used in systems such as the above-described breakaway system. The charger of the '103 patent is temperature regulated, having a regulator that controls the charging voltage applied to the battery, such that the charger outputs a first level when the battery is charging at a constant current, a second level (comprising a constant voltage) when the desired final charge state is reached, and a third level comprising a "float" voltage for long-term storage. The charger of the '103 patent outputs a charging voltage at a controlled level regardless of whether the supply voltage is greater or less than the predetermined controlled charging level. This charger also includes a current-control driver circuit which controls the energy applied to the battery so that it receives an optimum level, to provide faster charging when the energy from the towing vehicle electrical system is greater. Because of its multiple capabilities and attributes, the system of the '103 patent is relatively complex and somewhat expensive to manufacture in relation to certain less expensive (and less capable) alternatives which have also been developed heretofore.

One very inexpensive commercially available charging device for batteries such as those mounted on a towed vehicle simply comprises a diode (often rated at three amperes of current) that is connected in series with a high-wattage resistor, typically having a resistance value within the range of 200 to 235 ohms. These components are electrically connected in series between the charging source, which is typically the positive terminal of the battery of the towing vehicle, and the positive terminal of the battery on the towed vehicle which needs to be charged, usually a lead-acid battery. During the beginning of charging operation, when the towed vehicle battery is very depleted (discharged) and the voltage differential between the charging battery and the battery to be charged is relatively large, the diode will conduct and the towing vehicle electrical system will begin to charge the towed vehicle battery. In this system, a high-wattage resistor is required because the current generated in the charging circuit may be large enough to result in a hazardous condition (e.g., excess heat, possibly causing a fire), particularly when the towing vehicle battery and the towed vehicle battery are improperly connected in reverse polarity, which creates a 24-volt potential, or when the battery on the towed vehicle is or becomes internally short-circuited. Although use of a high-wattage current-limiting resistor protects against such a potentially hazardous condition, a major drawback of this system is that, by including a relatively high resistance in the circuit, the normal or typical charging current is so small that the secondary battery receives very little charge, even over long periods of time. For example, if the towed vehicle battery is discharged to 12-volts and the charging (tow vehicle) battery is at 14-volts, there is a 2-volt differential across the diode/resistor combination (~200 ohms), which will result in a charge current of less than 10-milliamperes. At this rate, over five days of continuous charging, the battery which needs to be charged will not regain more than 0.1-volts of charge, thus making this system, at most, very marginally useful.

Therefore, a need exists for a battery charger for towed vehicle batteries that is relatively inexpensive and also capable of providing enough charge to insure that the secondary (towed vehicle) battery remains sufficiently charged.

SUMMARY AND BRIEF DESCRIPTION OF THE INVENTION

The present invention effectively resolves the above-noted problems with currently available inexpensive battery chargers for towed vehicles and the like. The battery charger of the instant system utilizes a minimum amount of components to produce enhanced performance characteristics, thus making the system relatively inexpensive, yet capable of providing effective and useful amounts of charging current over a wide range of applications, and thus highly cost-effective.

Unlike other inexpensive battery charging systems, the present invention is capable of producing a generally constant charging current over a wide range of different applied voltages, to provide efficient and effective charging capabilities. The instant system accomplishes this result by combining a variable-conductance device such as a positive temperature coefficient thermistor (a "PTC" thermistor) and a series diode between a power supply, i.e., a primary, charging battery at the towing vehicle, and the positive terminal of a secondary battery, for example, one that is mounted on the towed vehicle to operate its "break-away" braking system, etc. In operation, when the secondary battery discharges to a predetermined lower level, the increased voltage potential across the diode will cause the diode to conduct, and it will thus apply a charging voltage from the primary battery through the variable-conductance device (e.g., PTC thermistor, hereinafter simply referred to as "PTC" for convenience) to the other battery. To limit the heat so generated, the PTC limits the charging current to provide a basically constant current level over a range of applied voltages.

PTC thermistors are thermally sensitive resistors made (for example) of polycrystalline ceramic materials having high-resistivity base compounds that are made semi-conductive by the addition of dopants. Among other features, the PTC is self-heated and, therefore, it normally remains at a nearly constant temperature; further, it has a temperature coefficient which, when a particular threshold is reached, substantially alters the performance characteristics (resistance/conductance) of the PTC. As the applied voltage (voltage across the circuit) is increased, the PTC limits the amount of current that is permitted to flow to the secondary battery. Thus, when the secondary battery requires a large amount of charging current, the PTC will supply larger amounts but will enter a "controlled current" mode, limiting the current and minimizing the chance that a hazardous condition will result. However, when the current demands are lowered, the temperature coefficient threshold of the PTC will not be reached. Under these conditions, the PTC will act like a conventional resistor (~25 ohms) and will permit approximately 40 milliamperes (mA) of charging current to charge the secondary battery where only a one-volt differential exists between the primary battery or other source and the secondary battery. When the temperature coefficient threshold of the PTC is exceeded, however, the PTC will allow the charging battery to apply approximately 100 mA of charging current to the secondary battery.

DESCRIPTION OF PREFERRED EMBODIMENT

Figure 1:
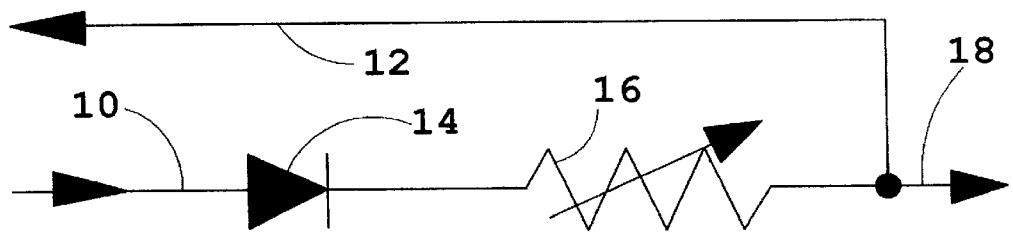
FIG. 1 is a schematic diagram of the charging circuit of the instant invention.

A preferred embodiment of the instant invention is depicted electrically in FIG. 1, wherein the conductor 10 represents the input, which is to be electrically coupled to the power source (e.g., the positive terminal of the charged battery or supply on the towing vehicle). The conductor designated 12 is to be electrically coupled to a control switch (not shown); e.g. the "break-away" switch that causes actuating power from the secondary or break-away battery to be applied to the brakes of the towed vehicle upon separation of the towed vehicle from the towing vehicle, but otherwise blocks such power flow. Accordingly, conductor 12 is normally open and has no effect during the charging operation; of course, when breakaway happens the towed vehicle is disconnected from the towing vehicle, and conductor 10 is then an open circuit. In other applications of the present charging circuit, the conductor 12 may not be necessary, or could be used as a control input, operated in any desired manner by any appropriate switch device.

Figure 2:
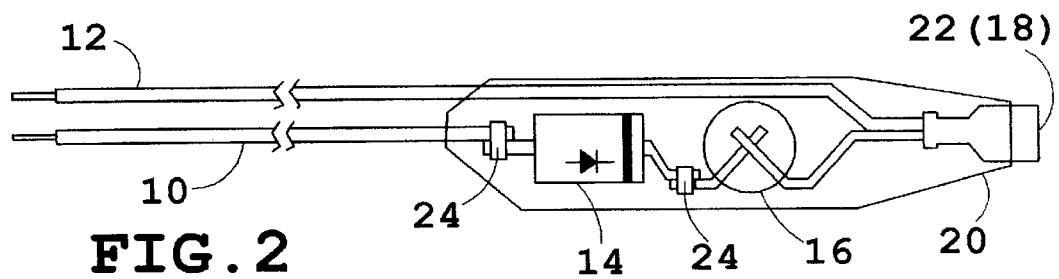
FIG. 2 is a plan view and circuit diagram of the charging circuit of the instant invention.

The diode 14 and the PTC 16 are electrically coupled in series between the charging power source (tow vehicle battery) and the positive terminal of the secondary or break-away battery (via connector 18). As best shown in FIG. 2, the operating components of the charging circuit (diode 14 and PTC 16) are preferably enclosed by heat-shrink tubing 20 that physically protects these components.

In the preferred embodiment, the charging circuit is comprised of a 25 ohm PTC having a temperature transition of approximately 60° C. that permits the system to produce a significant charging current without exceeding the permitted temperature range of the shrink tubing 20. Specific examples of preferred components for the vehicle implementation of the invention noted above are, for diode 14, #1N5402/5404, and for PTC 16, Keystone #RL551025-60-120-PTO. Terminal 22, which provides the connection for conductor 18, is preferably an insulated terminal such as Ark-Less 3500 A 209 A. The physical and electrical connections 24 are preferably Auto-Splice connectors, or soldered joints.

Figure 3:
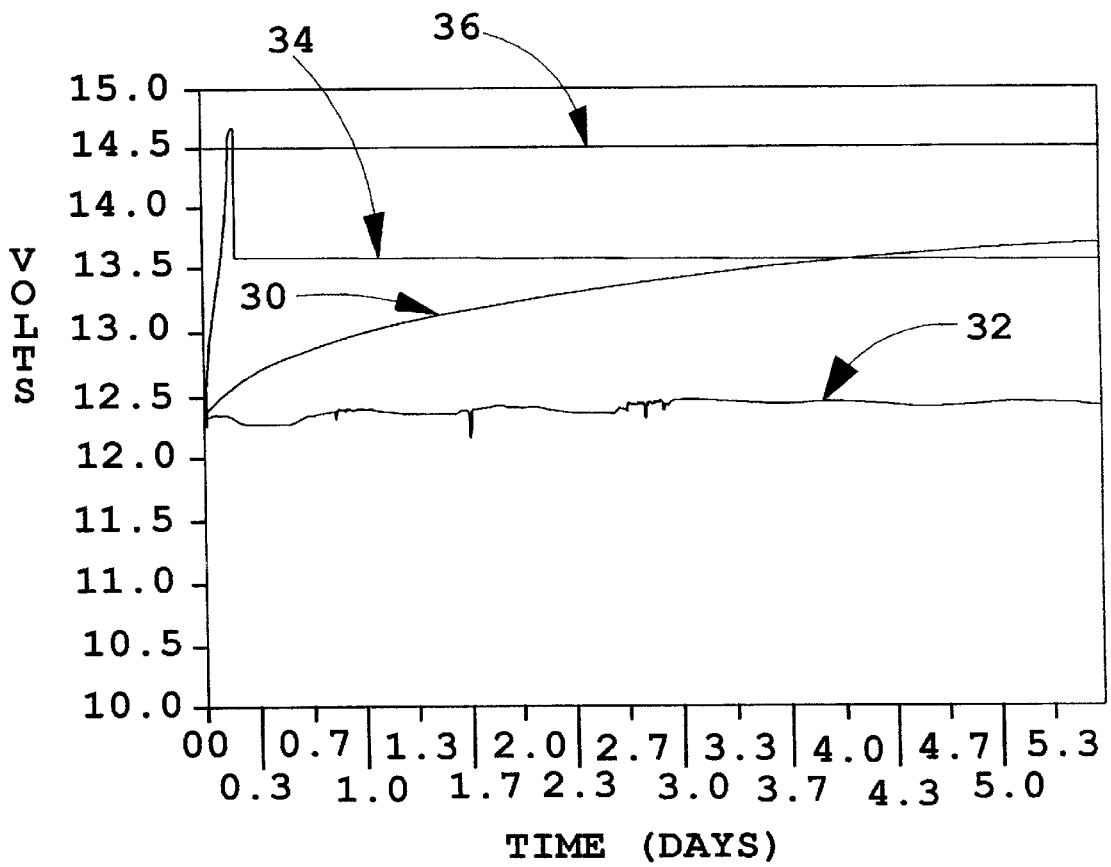
FIG. 3 is a comparison plot showing the charging characteristics of certain representative charging circuit systems, including that of the present invention, as discussed below.

Turning to FIG. 3, the charging characteristics of the instant PTC-diode system (center trace 30, as labeled) are compared to the known low-cost, low-performance resistor-diode system referred to above (bottom trace 32) and to the more elaborate charging system of the previously discussed U.S. Pat. No. 5,289,103 (upper trace 34), the steady-state power supply voltage being represented by trace 36. The voltage of the secondary or break-away battery to be charged (vertical axis) is plotted against the amount of time (in days, horizontal axis) that the power supply (charging battery) supplies a charging voltage to the secondary battery. Although the PTC-diode system of the instant invention (trace 30) does not immediately provide as large a charging voltage as the more complex (and more expensive) system of the '103 patent, the charging circuit of the instant invention does reach that level in due course, and it provides a clearly superior performance advantage over the known resistor-diode system (trace 32) at a greater efficiency. As shown, the instant system provides a continuously increasing charging voltage which reaches 13-volts after only about one day. To the contrary, the known resistor-diode system (trace 32) provides only very slightly more charging voltage than the voltage of the initially discharged break-away battery itself, even after four days of charging. In sum, the charging circuit of the instant invention provides at least ten times the amount of current to the break-away battery compared to the maximum current that the known diode-resistor combination produces.

The above description is considered that of the preferred embodiment(s) only. Modifications of this or other embodiments may occur to those skilled in the art and to those who make or use the invention, after studying the above description or a product embodying the same, and these may include changes in the particular field of application as well as in the particular components described above. For example, other functionally analogous components or circuitry may be substituted for the described PTC thermistor, for example, polymeric "resettable fuse" PTC components, as well as other types of PTC devices (e.g., such components as enhancement-mode FETs, i. e., MOSFETs). Therefore, it is to be understood that the embodiment(s) shown in the drawings and described herein are merely for illustrative purposes and should not be used to limit the scope of the invention, which is defined by the following claims as interpreted according to the principles of patent law, including the doctrine of equivalents.

What is claimed is:

1. An electrical charging circuit for applying a controlled charge to a receiving device, comprising:
   a voltage potential-responsive component for sensing the charge level of a receiving device coupled thereto; and
   a variable-conductance circuit component for producing a generally constant charging current output over a wide range of applied voltages, said variable-conductance component being serially coupled to said voltage potential-responsive component and operable to provide a first amount of current flow to said receiving device at a given applied voltage and temperature but to limit such current when the voltage differential across the charging circuit is sufficiently large to create a predetermined greater amount of current flow in said circuit and to said receiving device.

2. The electrical charging circuit as set forth in claim 1, wherein said variable-conductance circuit component comprises a positive-temperature-coefficient device.

3. The electrical charging circuit as set forth in claim 2, wherein said positive-temperature-coefficient device comprises a PTC thermistor component.

4. A battery maintenance device for insuring that a secondary battery mounted on a vehicle is sufficiently charged to actuate an electrically powered apparatus on that vehicle, including:

a charging circuit having an input to be electrically coupled between a power source and the secondary battery, wherein the charging circuit includes a voltage-responsive switch serially coupled to a PTC thermistor, wherein the PTC thermistor produces a generally constant charging current output over a wide range of applied voltages.

* * * * *